United States Patent
Shemtov

(10) Patent No.: US 6,476,319 B1
(45) Date of Patent: Nov. 5, 2002

(54) JUNCTION BOX CONNECTOR

(76) Inventor: Sami Shemtov, 3640 Yacht Club Dr., Apt. 2005, Aventura, FL (US) 33180

( * ) Notice: Subject to any disclaimer, the term of this patent is extended or adjusted under 35 U.S.C. 154(b) by 0 days.

(21) Appl. No.: 09/849,634

(22) Filed: May 4, 2001

(51) Int. Cl.[7] ................................................. H02G 3/18
(52) U.S. Cl. ...................... 174/65 R; 174/64; 174/135; 439/544; 285/195
(58) Field of Search .................. 174/64, 65 R, 174/135, 60, 34, 48, 65 G; 248/56; 16/2.2; 439/544, 545, 553, 372, 373; 285/195, 161, 360, 376, 401

(56) References Cited

U.S. PATENT DOCUMENTS

| | | | | |
|---|---|---|---|---|
| 3,333,501 A | * | 8/1967 | Pitcher | |
| 4,711,974 A | * | 12/1987 | Borsh | 174/65 R |
| 4,758,023 A | * | 7/1988 | Vermillion | 285/401 X |
| 5,013,872 A | * | 5/1991 | Lockwood et al. | 174/65 R |
| 5,165,735 A | * | 11/1992 | Nardi et al. | 285/369 |
| 5,171,164 A | * | 12/1992 | O'Neil et al. | 439/552 |
| 5,763,832 A | * | 6/1998 | Anselm | 174/65 R |
| 5,771,576 A | * | 6/1998 | Braxton et al. | 174/65 R |

* cited by examiner

Primary Examiner—Dean A. Reichard
Assistant Examiner—Dhiru R Patel
(74) Attorney, Agent, or Firm—Howard C. Miskin, Esq.; Gloria Tsui-Yip, Esq.

(57) ABSTRACT

A junction box connector having a tubular body through which an electrical wire-carrying conduit is passed for termination at the junction box plate. The connector has an end which is designed to engage in an opening in the junction box plate, and may be locked in position so as to prevent axial pullout of the connector once it is in locked position, thus assuring electrical connection of the electrical wires in the junction box.

8 Claims, 2 Drawing Sheets

JUNCTION BOX CONNECTOR

FIELD OF THE INVENTION

The present invention relates to a conduit connector for attachment to an electrical junction box and is particularly related to a conduit connector which is simple to construct and easy to attach to an electrical junction box and which, due to its novel construction, prevents dislocation of the connector or its axial pullout.

BACKGROUND OF THE INVENTION

Connectors for electrical wire-carrying conduits are widely used in industrial and residential establishments. These connectors are usually attached to an electrical junction box in order to establish electrical contact between the terminals of various wires running through one or more conduits in the junction box. It is therefore essential that not only the conduit connector or connectors terminate in the junction box but that measures be taken to prevent axial pullout or dislocation of the connector from the junction box which will place a strain on the electrical connection between various conductors carried by the conduits. These problems have received attention in the art and various conduit connectors have been described for terminating the conduit and mechanically and electrically supporting the conduit in the junction box. These mechanical devices are generally classified as "strain relief".

U.S. Pat. No. 5,647,613 issued Jul. 15, 1997 to Marik et al., describes conduit connectors which typically include a cylindrical body which is attached to the junction box through a knock-out opening to allow passage of the electrical conductors into the junction box. A set screw through the cylindrical body serves to securely retain the conduits passing through the body. Other known connectors are described in various patents which are referred to in the aforementioned Marik et al. patent. These prior art connectors, however, are complicated to manufacture, difficult to use and fail to adequately insure against axial pullout of the conduits. Accordingly, the Marik et al. patent describes a conduit connector which attempts to overcome the shortcomings of the prior art devices by easily and securely connecting the conduit connector to the junction box insuring against axial pullout of the conduit from the junction box. However, as it can be seen from the various drawings and corresponding description in the Marik et al. patent, the conduit connector described therein is also complicated to construct and install in an electrical junction box.

It is therefore an object of the present invention to provide a conduit connector which is simple to construct and to attach to an electrical junction box.

It is a further object of the invention to provide such conduit connector which can be easily secured to an electrical junction box and which is resistant against axial pullout or dislocation while insuring the integrity of adequate electrical connection.

The foregoing and other objects and features of the invention will be more clearly understood from the following detailed description of the invention and the accompanying drawings.

SUMMARY OF THE INVENTION

This invention provides a junction box connector which comprises a tubular body having a proximal end for passage therethrough of electrical wire-carrying conduit, and a distal end designed to terminate at and be securely locked in position in a mating junction box plate. At its distal end, the connector comprises a bushing having an axially extending end and one or more, preferably three tabs transversely extending from said end which are adjustable at a predetermined angle to the longitudinal axis. The connector may be a single molded piece or it may be formed by assembling the tubular body and the bushing with its axial end. A generally circular opening is provided in the junction box plate for cooperatively receiving said connector end, said opening having one or more peripheral slots, each cooperatively receiving one of said tabs. By inserting said connector end through said opening and each tab through a cooperative slot in the junction box plate and twisting it in counterclockwise direction, the connector will be locked in position due to the angular displacement of the tab relative to the rear surface of the junction box plate. A stop member in the plate is located such that it prevents the connector member from turning further.

BRIEF DESCRIPTION OF THE DRAWINGS

In the drawings, wherein like reference numerals designate like parts where possible.

DETAILED DESCRIPTION OF THE INVENTION

Figure 1:
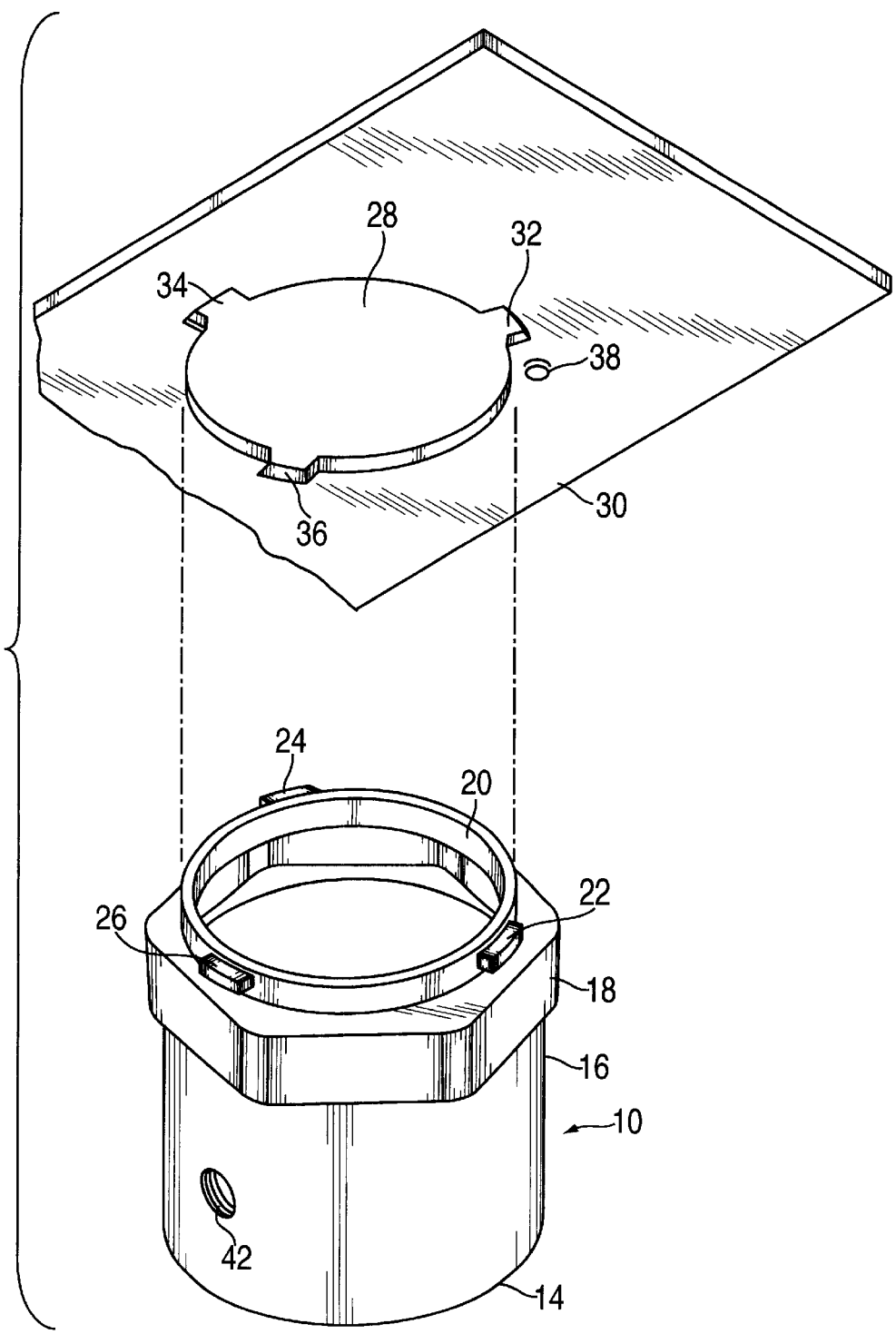
FIG. 1 is a partially perspective exploded view of the conduit connector of the present invention and its associate electrical junction box.

Referring first to FIG. 1, there is shown a connector in the form of a tubular member generally designated as 10 having a proximal end 12 adapted for receiving a conduit such as pipe or a duct 14 carrying electrical wires or cables (not shown) for terminating at the junction box. It must be mentioned that the detailed construction of the electrical wire-carrying conduit 14 and its attachment to the connector 10 are not per se critical as these are well known in the art and are described in numerous patents such as, e.g., U.S. Pat. No. 5,165,735 issued to Nardi et al. on Nov. 24, 1992 and the patents referred to therein.

As shown in FIG. 1, the connector 10 has a distal end 16 comprising a bushing 18 shown in hexagonal form, although it may have some other geometrical form. The bushing 18 has an axially extending end 20 having a circular opening, and one or more, preferably three, transverse tabs 22, 24 and 26 which are adjustable at predetermined angle relative to the longitudinal axis. The axially extending end 20 is cooperatively received in a circular opening 28 in the junction plate 30. The circular opening 28 in the junction box plate 30 has one or more, preferably three slots 32,34 and 36 for receiving the corresponding tabs 22, 24 and 26. Thus, by inserting the axial end 20 of the connector 10 through the opening 28 and inserting each of the tabs 22, 24, 26 through the corresponding slots 32,34, 36 and twisting the connector in a couterclockwise direction, the connector can be locked in position and is prevented from turning further by the stop member 38 in the junction box plate 30.

Figure 2:
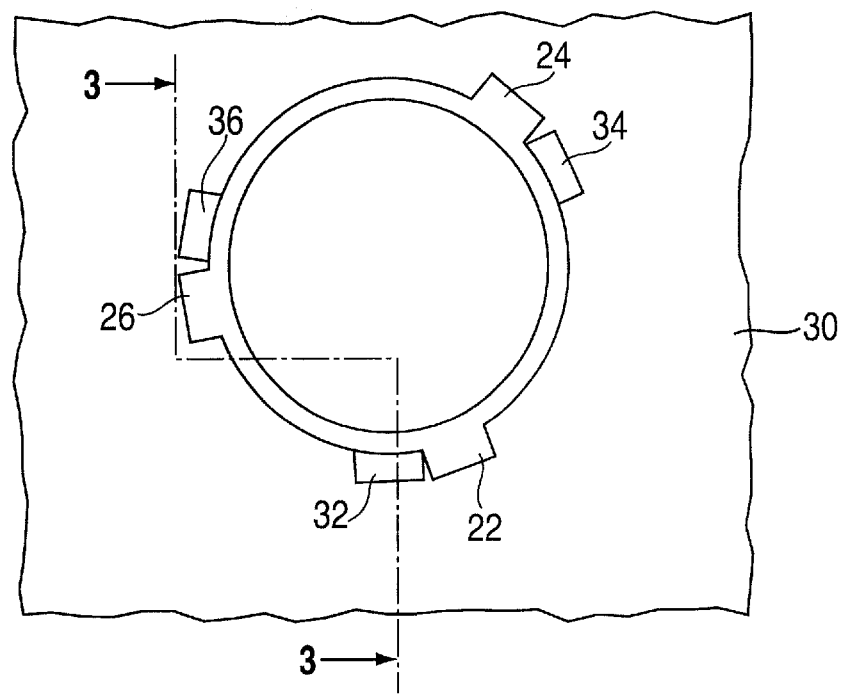
FIG. 2 is a top plan view showing the plate of the electrical junction box.
Figure 3:
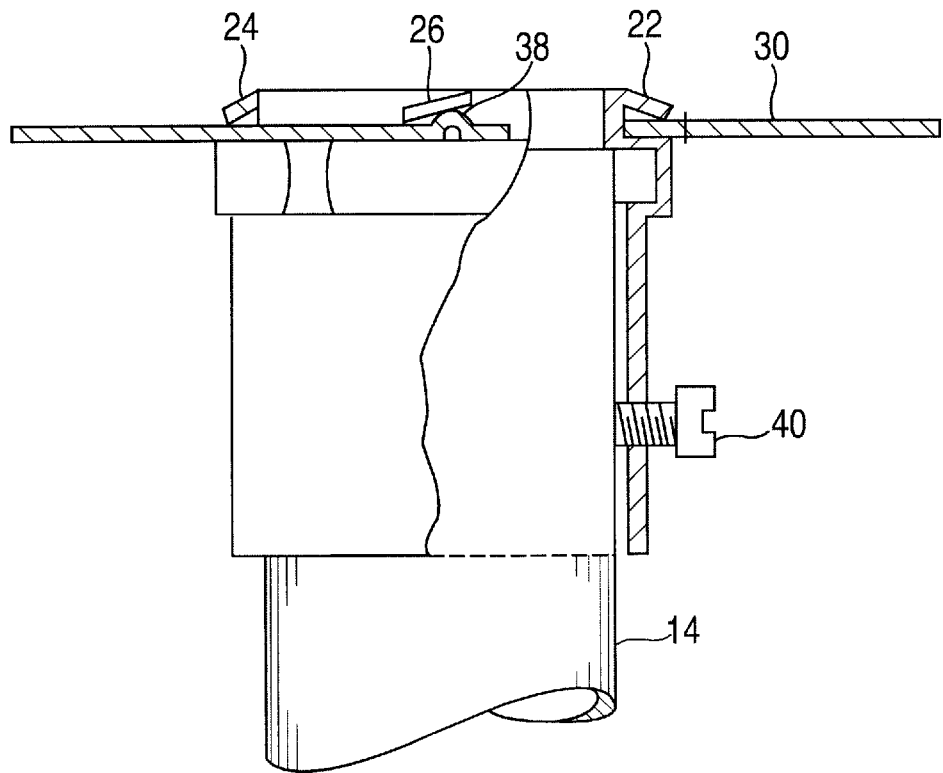
FIG. 3 is a sectional view taken along the line 3—3 of FIG. 2.

In use, in order to secure the wire-carrying conduit to the junction box, the conduit, e.g., the pipe 14 is passed through the proximal end 12 of the connector 10 until the electrical wires (not shown) through the pipe 14 terminate at their connection in the junction box. The pipe 14 is securely fixed in position by the set screw 40 which may be a threaded stem screw inserted through an internally threaded aperture 42 in the connector body. With pipe 14 locked in position, the connector 10 is connected to the junction box as aforesaid and the axial end 20 is twisted counterclockwise (see Arrow A in FIG. 2) until the tab 26 engages against the stop 38. In order to disassemble the connector, the above procedure is reversed.

While the invention has been described with a certain degree of particularity, several modifications may be made therein which are obvious from the foregoing detailed description. For example, the connector 10 and its associated bushing member may be separate pieces which can be assembled and used as hereinbefore described. Also, while the axial end 20 is shown to comprise three triangularly disposed tabs spaced equidistantly from one another, more or less tabs may be used with correspondingly more or less slots in the junction box plate. Of course, the connector may be formed of metal or a suitable plastic, if desired. Additionally, rather than stamping the junction plate 30 to form the circular opening 28 and the slots 32, 34, 36, the junction box plate may be provided with a raised circular member which can be fixed to the plate thus providing an alternate way of connecting the axial end 20 to the junction box plate 30. Other modifications can be made which are suggested from the aforementioned description.

What is claimed is:

1. A connector for connecting electrical wires-carrying conduit to a junction box, said connector having a longitudinal axis and comprising a tubular member having a proximal end for passage of electrical wires-carrying conduit therethrough, a distal end comprising an axially extending end having a generally circular opening and at least one tab angularly disposed relative to the longitudinal axis of said tubular member, in combination therewith, a junction box having a plate comprising a generally circular opening adapted to cooperatively receive the circular opening in said axially extending end of the distal end of said connector, at least one slot about said generally circular opening on said plate adapted to cooperatively receive said tab, and a stop member on said plate such that when said tab is inserted into said slot and turned in a counterclockwise direction, said stop member prevents said tab from further rotation thereby locking said axially extending end in position.

2. A connector as in claim 1 wherein said axially extending end comprises three spaced apart tabs, and said generally circular opening includes three spaced apart slots, each slot adapted to cooperatively receive one of said tabs.

3. A connector as in claim 2 wherein said tubular member has an internally threaded aperture and an adjustable threaded set screw through said aperture, wherein said set screw is adjustable to retain said conduit in fixed position.

4. A connector as in claim 1 wherein said axially extending end has three tabs angularly disposed to the longitudinal axis of said connector and spaced equidistantly relative to one another and said slots are spaced equidistantly with each slot adapted to cooperatively receive a corresponding one of said angularly disposed tabs.

5. A connector as in claim 4 wherein tubular member has an internally threaded aperture and an adjustable threaded set screw through said aperture, wherein said set screw is adjustable to retain said conduit in fixed position.

6. A connector as in claim 1 wherein said tubular member has an internally threaded aperture and an adjustable threaded set screw through said aperture, wherein said set screw is adjustable to retain said conduit in fixed position.

7. A connector for connecting electrical wires—carrying conduit to a junction box, said connector having a longitudinal axis and comprising a tubular member having a proximal end for passage of electrical wires—carrying conduit therethrough, a distal end comprising an axially extending end having a generally circular opening with a plurality of tabs extending transversely therefrom, said tabs being angularly disposed relative to the longitudinal axis of said tubular member, in combination therewith, a junction box, having a plate with a generally circular opening adopted to cooperatively receive said distal connector end of said connector, said plate having a plurality of slots about the periphery of said circular opening, each slot cooperatively receiving one of said plurality of tabs, wherein when said corresponding tabs are inserted in said corresponding slot and rotated in the direction of the angle of the tabs to the longitudinal axis, the connector is locked to the junction box plate.

8. The connector as in claim 7 further including a stop member on said plate to cooperate with a tab when it is inserted into said slot and rotated, such that the stop member prevents the tab from further rotation, thereby locking the axially extending end in position.

* * * * *